US 9,327,266 B2

(12) United States Patent
Burgin

(10) Patent No.: US 9,327,266 B2
(45) Date of Patent: May 3, 2016

(54) ABSORBENT POLYMER REINFORCING FIBER

(71) Applicant: Timothy P. Burgin, King George, VA (US)

(72) Inventor: Timothy P. Burgin, King George, VA (US)

(73) Assignee: The United States of America as Represented by the Secretary of the Navy, Washington, DC (US)

(*) Notice: Subject to any disclaimer, the term of this patent is extended or adjusted under 35 U.S.C. 154(b) by 26 days.

(21) Appl. No.: 14/331,258

(22) Filed: Jul. 15, 2014

(65) Prior Publication Data
US 2016/0016149 A1    Jan. 21, 2016

(51) Int. Cl.
B01J 20/26    (2006.01)
B01J 20/28    (2006.01)

(52) U.S. Cl.
CPC .............. *B01J 20/26* (2013.01); *B01J 20/261* (2013.01); *B01J 20/262* (2013.01); *B01J 20/28014* (2013.01)

(58) Field of Classification Search
CPC ........................................... B01J 20/26
USPC .......................................... 502/402
See application file for complete search history.

(56) References Cited

U.S. PATENT DOCUMENTS

| 5,641,847 A | 6/1997 | Hozumi et al. ............ 526/328.5 |
| 5,885,602 A | 3/1999 | Levy .............................. 424/405 |
| 6,479,593 B2 | 11/2002 | Clements et al. .......... 525/329.7 |
| 8,252,715 B2 * | 8/2012 | Torii ...................... A61F 13/53 502/402 |

* cited by examiner

*Primary Examiner* — Edward Johnson
(74) *Attorney, Agent, or Firm* — Gerhard W. Thielmar, Esq.

(57) ABSTRACT

A reinforced absorbent polymer is provided for improving mechanical properties without degrading their absorption performance. The reinforced polymer includes an absorbent polymer; and at least one fiber for reinforcement disposed in the polymer.

19 Claims, 3 Drawing Sheets

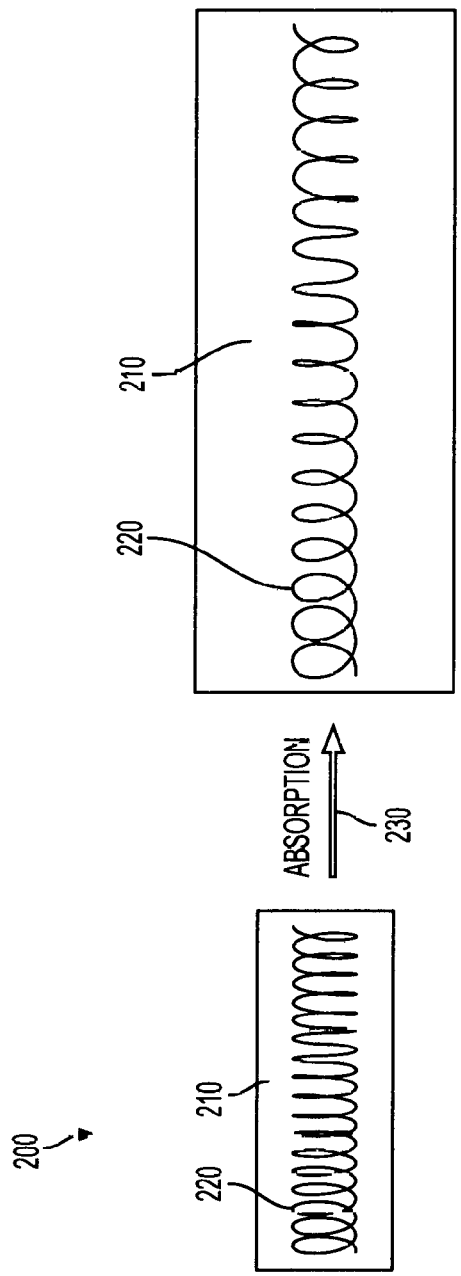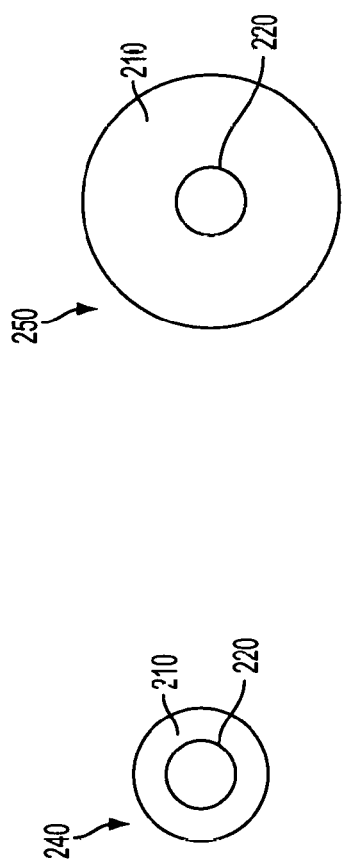

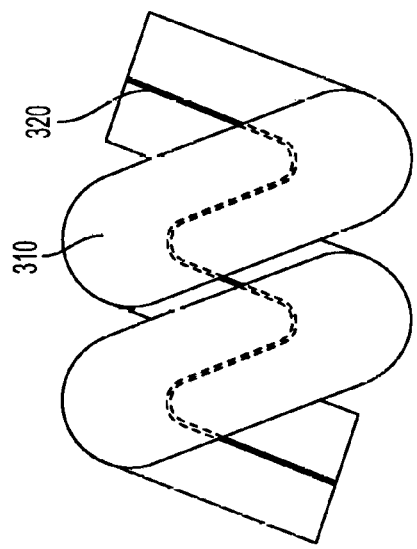
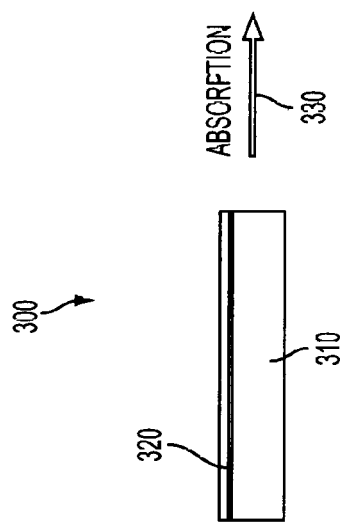
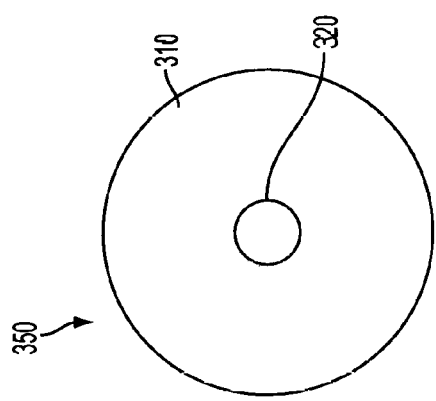
FIG. 3A
FIG. 3B
FIG. 3C

ABSORBENT POLYMER REINFORCING FIBER

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The present invention generally relates to absorbent polymers. In particular, the invention relates more specifically to reinforcing fiber of absorbent polymers to increase the shear and tensile mechanical strength of absorbent polymers without significantly decreasing their absorption capacity.

Absorbent polymers are known in various technologies. For example, absorbent polymers can be used to absorb hydrocarbons from an aqueous medium, such as the absorption of oil from water. In some configurations, conventional absorbent polymers are contained within a permeable material. For example, conventional spill "socks" and booms can hold an absorbent polymer within a fabric to enable the absorbent polymer to be applied directly to the site of interest. Moreover, conventional absorbent booms can float on a water surface to help contain a spill from spreading beyond the boom. This application, however, requires the absorbent polymer to be contained within a permeable membrane or fabric.

In other configurations, conventional absorbent polymers are applied as a powder to a water surface. The absorbent may absorb the hydrocarbon and even gel together. This process, however, requires the removal of the resulting gel formed from the swelled absorbent polymer. The resulting gel can lack adequate shear and tensile mechanical strength and may be difficult to remove.

SUMMARY

Consequently, a need exists for an absorbent polymer that has an enhanced shear and tensile mechanical strength to facilitate recovery of the polymer after absorbing the desired liquid. Conventional absorbent polymers yield disadvantages addressed by various exemplary embodiments of the present invention. In particular, various exemplary embodiments provide a reinforced absorbent polymer includes an absorbent polymer; and a reinforcing fiber disposed in the polymer, such that the reinforcing fiber facilitates the absorbent polymer to expand while absorbing the liquid.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIGS. 2A, 2B and 2C are schematic representations of an exemplary reinforcing fiber configuration of an absorbent polymer where a tube of absorbent polymer is reinforced with a coil of fiber near an inside surface thereof; and FIGS. 3A, 3B and 3C are schematic representations of an exemplary reinforcing fiber configuration of an absorbent polymer where a rod of absorbent polymer is reinforced with a fiber running near an outside surface thereof.

DETAILED DESCRIPTION

Figure 1:
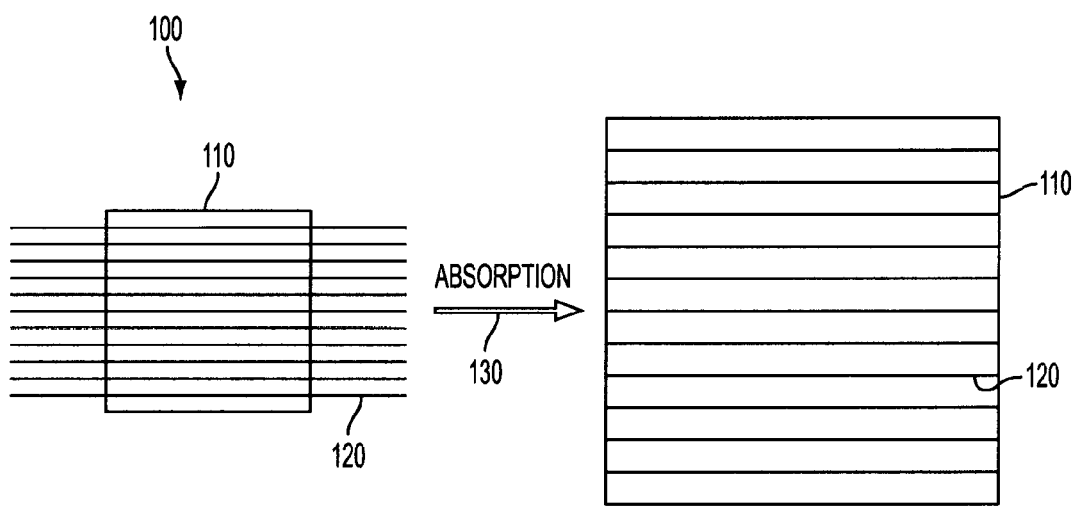
FIG. 1 is a schematic representation of an exemplary reinforcing fiber configuration of an absorbent polymer with parallel fibers that enable the polymer to slide past the fibers during expansion.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

This disclosure relates generally to fiber reinforced absorbent polymers and techniques for improving the mechanical properties of absorbent polymers without compromising their absorption performance. This process can be achieved through the incorporation of fibers of a material with a high mechanical strength relative to that of the absorbent polymer. There are numerous possible configurations for reinforcing fiber, but the performance can be optimized upon satisfaction of the following criteria:

(1) The frictional interface between the fibers and the polymer should have low surface tension to permit the polymer to slide past the fiber during volume expansion caused by absorption and the fibers should be of sufficient length to accommodate the expansion of the reinforced polymer.

(2) If the polymer cannot slide past the fibers during expansion, the fibers can be localized along a line or plane contained within the material and close to one face or edge of the material.

(3) The length of the fibers should be adequate to provide the desired mechanical strength but short enough to enable the fibers to be pulled through the material if desired.

(4) The fibers should be largely co-directional to enable for lateral expansion between the fibers and easier slippage at the fiber-polymer interface. The fibers can extend orthogonal to one another provided that criteria (1) and (3), are met and the fibers are not connected at the cross points, or if the fibers satisfy criterion (2).

Exemplary arrangements of an absorbent polymer that satisfy the above described criteria are described by the following configurations as specific examples not intended to limit the scope of the invention. As used herein, the term "fiber" or "reinforcing fiber" describes any fiber material suitable for operation in an absorbent polymer. Examples of these fibers include nylon, rayon, Kevlar, polyethylene, polypropylene, glass, metal and the like. As used herein, the term "absorbent polymer" refers to a polymer that can absorb a target liquid. Exemplary absorbent polymers include polyacrylic acid, polyamide, and similar materials.

FIG. 1 shows a schematic view 100 of an absorbent matrix in longitudinal cross-section. The matrix includes an absorbent polymer 110 disposed around a plurality of fibers 120 extending through the polymer 110 in a substantially parallel configuration. The fibers 120 permit the polymer 110 to slide past the fibers 120 during expansion thereof, as shown view 100. The polymer 110 expands during absorption 130 of liquid (from left without absorption to right with absorption).

Prior to absorption, the fibers 120 have a length sufficient to accommodate the expansion of the polymer 110. The fibers 120 can either extend beyond the polymer 110 as shown in view 100 or largely codirectional fiber segments of appropriate length can be offset within the material to provide fiber reinforcement throughout the fiber alignment direction.

FIG. 2A shows a schematic view 200 of an absorbent matrix in tubular form. An absorbent polymer 210 is shown in a tubular shape. A fiber 220 can be disposed as a helical coil at or near an inside surface of the polymer 210. The coil of the fiber 220 can be in a compressed state when the polymer 210 does not have a fluid absorbed therein. The polymer 210 undergoes absorption 230 of liquid to yield an extended state upon absorbing liquid.

FIGS. 2B and 2C show respective cross-sectional views 240 and 250 of the tubular absorbent matrix before and after absorption 230. While the fiber 220 is coiled, there may not be any spring tension applied in either the compressed or extended states. This configuration may be useful when the polymer cannot slide past the fibers during expansion, for example. While views 240 and 250 show the tubular shape of the polymer 210 being cylindrical, other geometric and non-geometric tubular shapes may be contemplated within the scope of the present invention. For example, the polymer 210 could be formed as a rectangular or triangular shaped tube.

FIG. 3A shows a schematic view 300 of an absorbent matrix in tubular form. An absorbent polymer 310 is shown in a rod shape. A fiber 320 can be disposed to extend near an outside surface of the polymer 310. The polymer 310 undergoes absorption 330 of liquid to spiral into coil upon absorbing liquid. A fiber 320 expand into a coil at or near an inside surface of the polymer 310. The coil of the fiber 320 can be in a compressed state when the polymer 310 does not have a liquid absorbed therein. The polymer 310 undergoes absorption 330 of liquid to yield an extended state upon absorbing liquid.

FIGS. 3B and 3C show respective cross-sectional views 340 and 350 of the rod absorbent matrix before and after absorption 330. The fiber 320 can be disposed to extend near an outside surface of the polymer 310. As the polymer 310 absorbs a liquid, the polymer 310 may coil as it expands.

While views 340 and 350 show the rod shape of the polymer 310 being cylindrical, other geometric and non-geometric rod shapes may be contemplated within the scope of the present invention. For example, the polymer 310 could be formed as a rectangular or triangular shaped rod. The fiber reinforced absorbent polymers may be used for various purposes. For example, the fiber reinforced absorbent polymers may be used for chemical spills, oil spills and the like.

The fibers are embedded into the polymer by their disposition in the pre-polymer mixture (monomers, solvent, constituent polymers, etc.) and subsequently performing the polymerization. To ensure slippage at the interface between the fibers and the polymer, the fiber surface should be as smooth as possible, insoluble in the pre-polymer mixture, and chemically inert under the polymerization conditions.

The fibers can be of arbitrary length provided they are largely codirectional, enable the desired level of expansion, and permit slippage at the fiber-to-polymer interface within the desired time frame. Typical fiber lengths range from millimeters to meters. The fiber diameter can also be adjusted to attain the desired mechanical properties, with a typical range of 10 nm to 1 mm. The reinforced polymer can be of arbitrary size and form factor. In addition, the reinforcement can be implemented in either a batch or continuous process.

The reinforcing fiber and absorbent polymer form an interface having appropriate surface tension sliding past each other during volume expansion of said absorbent polymer caused by absorption of the liquid. For liquids, surface tension (force-per-unit-length) corresponds also to surface energy density (effectively energy-per-unit-area or flux). Water, for example, has a value of 0.072 newtons-per-meter or joules-per-square-meter. Interfaces with low energy density possess more complete wetting (spreading of the liquid along a surface) and shallower contact angles than interfaces with high energy density. For purposes of this disclosure, the surface tension should be sufficiently low to enable the fiber to slip past the polymer while avoiding being pulled through, effectively being ejected and thereby unable to provide structural reinforcement to the polymer.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A reinforced absorbent polymer matrix for absorbing a target liquid, comprising:
    an absorbent polymer to absorb the liquid; and
    a reinforcing fiber disposed within said polymer, wherein said reinforcing fiber facilitates expansion of said absorbent polymer while absorbing the liquid, and an interface between said absorbent polymer and said reinforcing fiber has sufficiently low surface tension to permit said absorbent polymer to slide past said reinforcement fiber during volume expansion of said absorbent polymer caused by absorption.

2. The polymer matrix of claim 1, wherein said reinforcing fibers have a combined longitudinal length accommodating said absorbent polymer after volume expansion.

3. The polymer matrix of claim 1, wherein said reinforcing fiber includes a plurality of reinforcing fibers disposed in a parallel configuration.

4. The polymer matrix of claim 3, wherein said reinforcing fibers are localized along a plane contained within said absorbent polymer and adjacent to one of a face and an edge of said absorbent polymer.

5. The polymer matrix of claim 4, wherein said absorbent polymer is formed as a tubular member and said reinforcing fiber is disposed as a coil inside said absorbent polymer adjacent to an inside surface thereof.

6. The polymer matrix of claim 5, wherein said tubular member is a tubular cylindrical member.

7. The polymer matrix of claim 4, wherein said absorbent polymer, is formed as a rod member and the reinforcing fiber is disposed inside said absorbent polymer adjacent an outside surface thereof.

8. The polymer matrix of claim 7, wherein said rod member is a solid rod having a circular cross-section.

9. The polymer matrix of claim 1, wherein said reinforcement fiber has a length shorter than said adjacent polymer to enable said reinforcement fiber to be pulled through said absorbent polymer.

10. The polymer matrix of claim 1, wherein said reinforcement fiber include a plurality of reinforcement fibers disposed co-directional to permit lateral expansion between said reinforcement fibers.

11. The polymer matrix of claim 1, wherein said absorbent polymer is composed of one of polyacrylic acid and polyamide.

12. The polymer matrix of claim 1, wherein said reinforcing fiber is one of Kevlar, polyethylene and polypropylene.

13. A reinforced absorbent polymer matrix for absorbing a target liquid, comprising:
an absorbent polymer to absorb the liquid; and
a reinforcing fiber disposed in said polymer, wherein
said reinforcing fiber permits said absorbent polymer to absorb the liquid; and satisfies at least one criterion of the following criteria:
said reinforcing fiber forms an interface with said absorbent polymer having surface tension to enable said absorbent polymer to slide past said reinforcement polymer during volume expansion of said absorbent polymer caused by absorption of the liquid, while said reinforcing fiber has sufficient length to accommodate extension of said absorbent polymer after volume expansion,
said reinforcing fiber is localized along a plane contained within said absorbent polymer and adjacent one of a face and an edge of said absorbent polymer,
said reinforcement fiber has sufficient length to provide adequate mechanical strength while inhibiting said reinforcement fiber from pulling through said absorbent polymer, and
said reinforcement fiber includes a plurality of reinforcement fibers disposed co-directional to permit lateral expansion between said reinforcement fibers.

14. The polymer matrix of claim 13, wherein said absorbent polymer is formed as a tubular member and said reinforcing fiber is disposed as a coil inside said absorbent polymer adjacent an inside surface thereof.

15. The polymer matrix of claim 14, wherein said tubular member is a tubular cylindrical member.

16. The polymer matrix of claim 13, wherein said absorbent polymer is formed as a rod member and said reinforcing fiber is disposed inside said absorbent polymer adjacent an outside surface thereof.

17. The polymer matrix of claim 16, wherein said rod member is a solid rod having a circular cross-section.

18. The polymer matrix of claim 13, wherein said absorbent polymer is composed of one of polyacrylic acid and polyamide.

19. The polymer matrix of claim 13, wherein said reinforcing fiber is one of nylon, rayon, Kevlar, polyethylene and polypropylene.

* * * * *